(12) United States Patent
Zhu

(10) Patent No.: US 11,745,760 B2
(45) Date of Patent: Sep. 5, 2023

(54) PARALLEL OBSTACLE BUFFER SYSTEM FOR PATH PLANNING

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 206 days.

(21) Appl. No.: 16/878,447

(22) Filed: May 19, 2020

(65) Prior Publication Data

US 2021/0362743 A1 Nov. 25, 2021

(51) Int. Cl.
*B60W 60/00* (2020.01)
*G06V 20/58* (2022.01)

(52) U.S. Cl.
CPC .... *B60W 60/0011* (2020.02); *B60W 60/0015* (2020.02); *G06V 20/58* (2022.01);
(Continued)

(58) Field of Classification Search
CPC ........... B60W 60/0011; B60W 60/001; B60W 60/0015; B60W 60/0016; B60W 60/0017; B60W 2554/802; B60W 2554/00; B60W 2554/20; B60W 2554/4023; B60W 2554/40; B60W 30/09; B60W 30/095; B60W 30/08; B60W 30/0953; B60W 30/0956; B60W 60/0018; B60W 60/0023; B60W 2556/50; B60W 30/00; B60W 2420/42; B60W 2420/52; B60W 50/14; B60W 2555/60; B60W 50/0097; B60W 30/10; B60W 2520/10; B60W 2756/10; B60W 30/18163; B60W 2552/05; B60W 30/12; B60W 2552/53; B60W 60/00274; B60W 2510/244; B60W 2554/4029; B60W 2555/20; B60W 60/0027; B60W 20/12; B60W 2554/4042; B60W 2720/106; B60W 30/143; B60W 40/04; B60W 50/08;
(Continued)

(56) References Cited

U.S. PATENT DOCUMENTS

2016/0144838 A1* 5/2016 Spencer ............ B60W 30/0953 701/1
2019/0138000 A1* 5/2019 Hammond ............ B60W 30/00
(Continued)

*Primary Examiner* — Adam R Mott
*Assistant Examiner* — Erick T. Detweiler
(74) *Attorney, Agent, or Firm* — WOMBLE BOND DICKINSON (US) LLP

(57) ABSTRACT

A path planning of the ADV is performed. A set of obstacle boundaries are generated for one or more obstacles, where each of the set of obstacle boundaries has a corresponding buffer distance ranging from a predetermined minimum buffer distance to a predetermined maximum buffer distance. A set of paths of the ADV is generated using quadratic programming based on the set of obstacle boundaries in parallel, where each path of the set of paths corresponds to one of the set of obstacle boundaries. A path is selected from successful paths of the set of paths based on a corresponding obstacle boundary having a smallest corresponding buffer distance, where the ADV is at least a predetermined distance away from the one or more obstacles in the successful paths. The ADV is controlled to drive autonomously according the selected path to avoid the one or more obstacles.

20 Claims, 10 Drawing Sheets

(52) U.S. Cl.
CPC ..... *B60W 2554/20* (2020.02); *B60W 2554/40* (2020.02); *B60W 2554/802* (2020.02)

(58) Field of Classification Search
CPC ....... B60W 10/20; G06V 20/58; G06V 20/56; G06V 20/176; G05D 2201/0213; G05D 1/0088; G05D 1/0214; G05D 1/0274; G05D 1/0027; G05D 1/0257; G05D 1/0212; G05D 1/0291; G05D 1/0038; G05D 1/024; G05D 1/0246; G05D 1/0297; G05D 2201/0212; G05D 1/0248
See application file for complete search history.

(56) References Cited

U.S. PATENT DOCUMENTS

| | | | |
|---|---|---|---|
| 2019/0250617 A1* | 8/2019 | Ford | B60W 30/095 |
| 2019/0257664 A1* | 8/2019 | Matsuda | G05D 1/0217 |
| 2020/0125122 A1* | 4/2020 | Chen | G05D 1/027 |
| 2021/0247762 A1* | 8/2021 | Park | G06K 9/6288 |

* cited by examiner

PARALLEL OBSTACLE BUFFER SYSTEM FOR PATH PLANNING

TECHNICAL FIELD

Embodiments of the present disclosure relate generally to operating autonomous driving vehicles. More particularly, embodiments of the disclosure relate to path planning for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is important to perform path planning to avoid obstacles. However, it is challenging to maintain a safe buffer distance to the obstacles while avoid being far away from a center of a road.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a path planning using QP may be performed to avoid obstacles. Multiple buffers for the one or more obstacles may be generated from a predetermined minimum buffer distance to a predetermined maximum buffer distance. The multiple buffers apply to all obstacles. During path planning, multiple threads may be used to calculate path with different buffers. The multiple threads are running in parallel, such that the multiple threads won't result in extra calculation time. After the path planning using the multiple threads all finished, QP path planning results are checked. A path planning result may be selected based on a smallest buffer distance among path planning results that are not failed, thus being successful. The successes path planning result with the smallest buffer distance may be used as an output path.

According to some embodiments, a driving environment is perceived based on sensor data obtained from a plurality of sensors mounted on an ADV, including detecting one or more obstacles. A path planning of the ADV is performed. A set of obstacle boundaries are generated for the one or more obstacles, where each of the set of obstacle boundaries has a corresponding buffer distance ranging from a predetermined minimum buffer distance to a predetermined maximum buffer distance. A set of paths of the ADV is generated using quadratic programming based on the set of obstacle boundaries in parallel, where each path of the set of paths corresponds to one of the set of obstacle boundaries. A path is selected from successful paths of the set of paths based on a corresponding obstacle boundary having a smallest corresponding buffer distance, where the ADV is at least a predetermined distance away from the one or more obstacles in the successful paths. The ADV is controlled to drive autonomously according the selected path to avoid the one or more obstacles.

Figure 1:
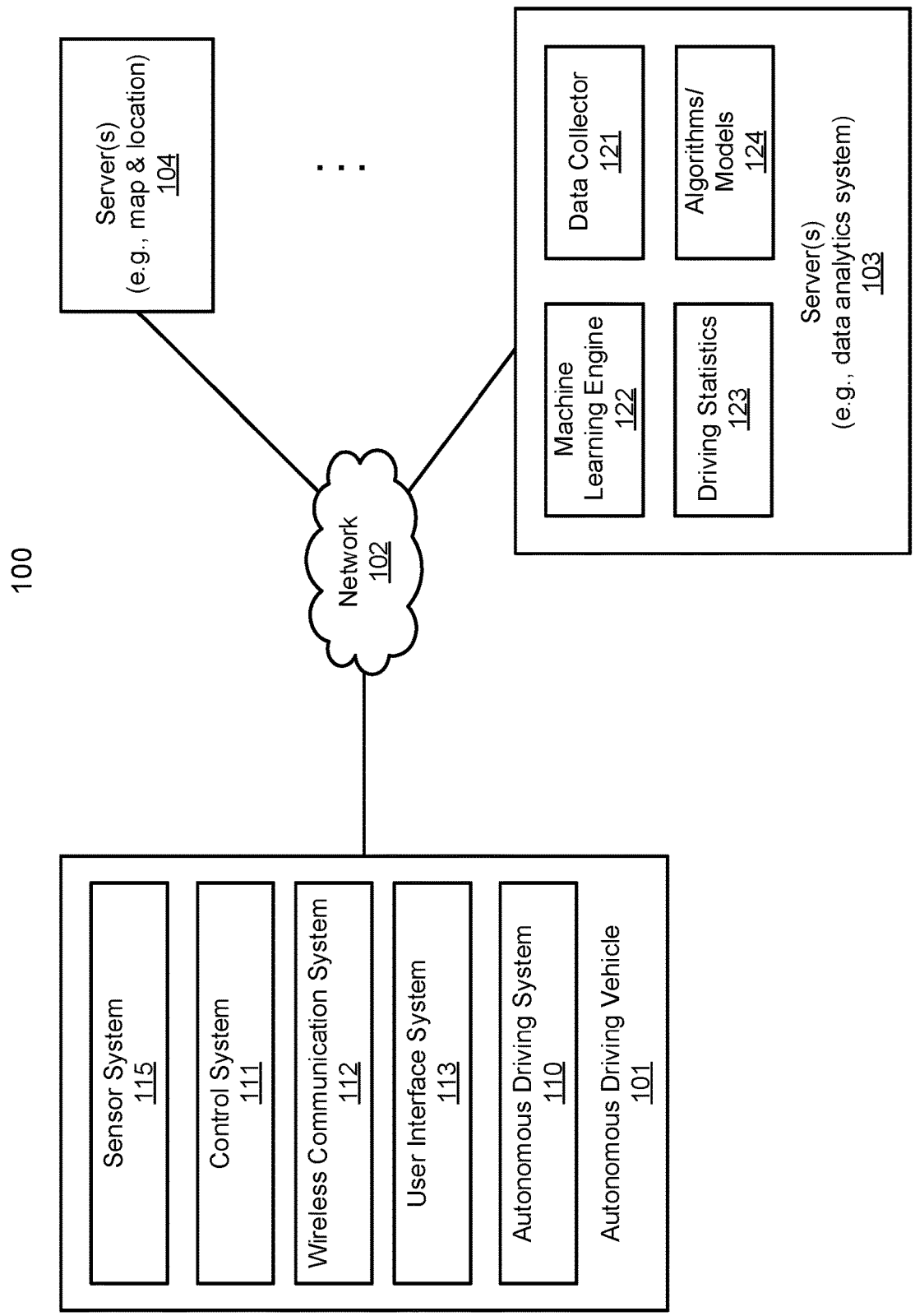
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
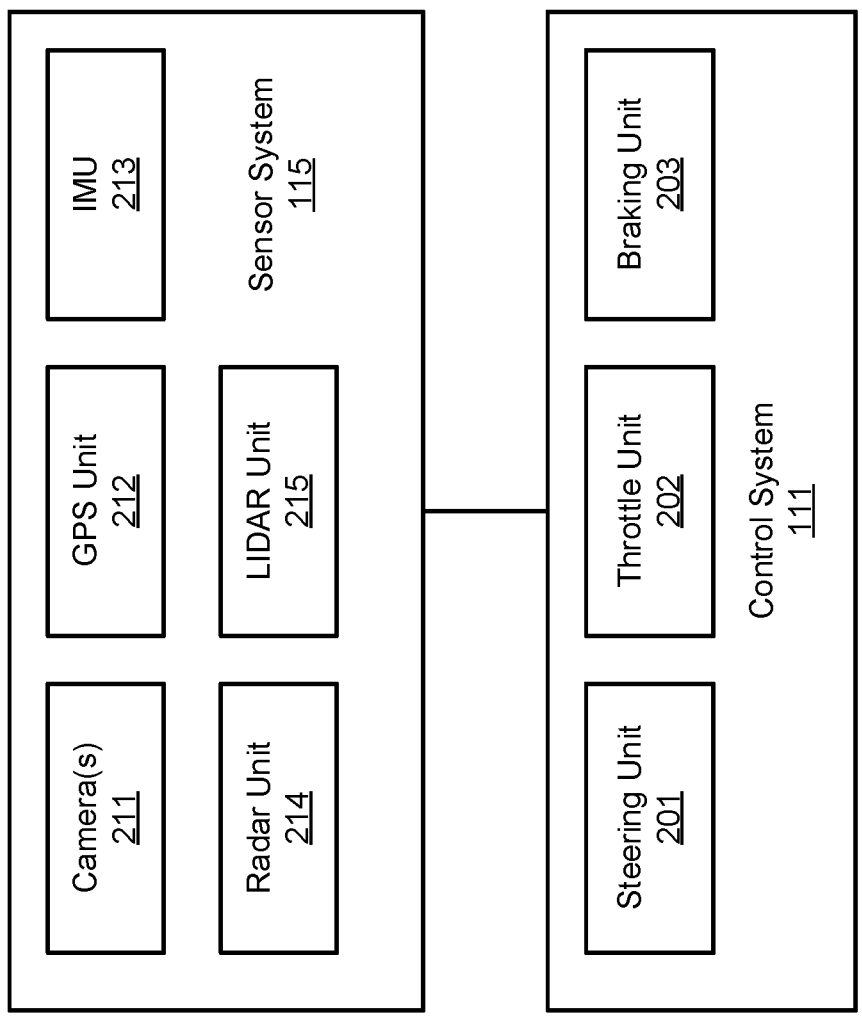
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to perceive a driving environment based on sensor data obtained from a plurality of sensors mounted on an ADV, including detecting one or more obstacles, an algorithm to perform path planning of the ADV, and an algorithm to control the ADV to drive autonomously according to the selected path to avoid the one or more obstacles. The algorithm to perform path planning of the ADV includes an algorithm to generate a set of obstacle boundaries for the one or more obstacles, each of the set of obstacle boundaries having a corresponding buffer distance ranging from a predetermined minimum buffer distance to a predetermined maximum buffer distance, an algorithm to generate a set of paths of the ADV using quadratic programming based on the set of obstacle boundaries in parallel, each path of the set of paths corresponds to one of the set of obstacle boundaries, and/or an algorithm to select a path from successful paths of the set of paths based on a smallest corresponding buffer distance, wherein the ADV is at least a predetermined distance away from the one or more obstacles in the successful paths. Algorithms 124 can then be uploaded on ADVs to be utilized during autonomous driving in real-time.

Figure 3A:
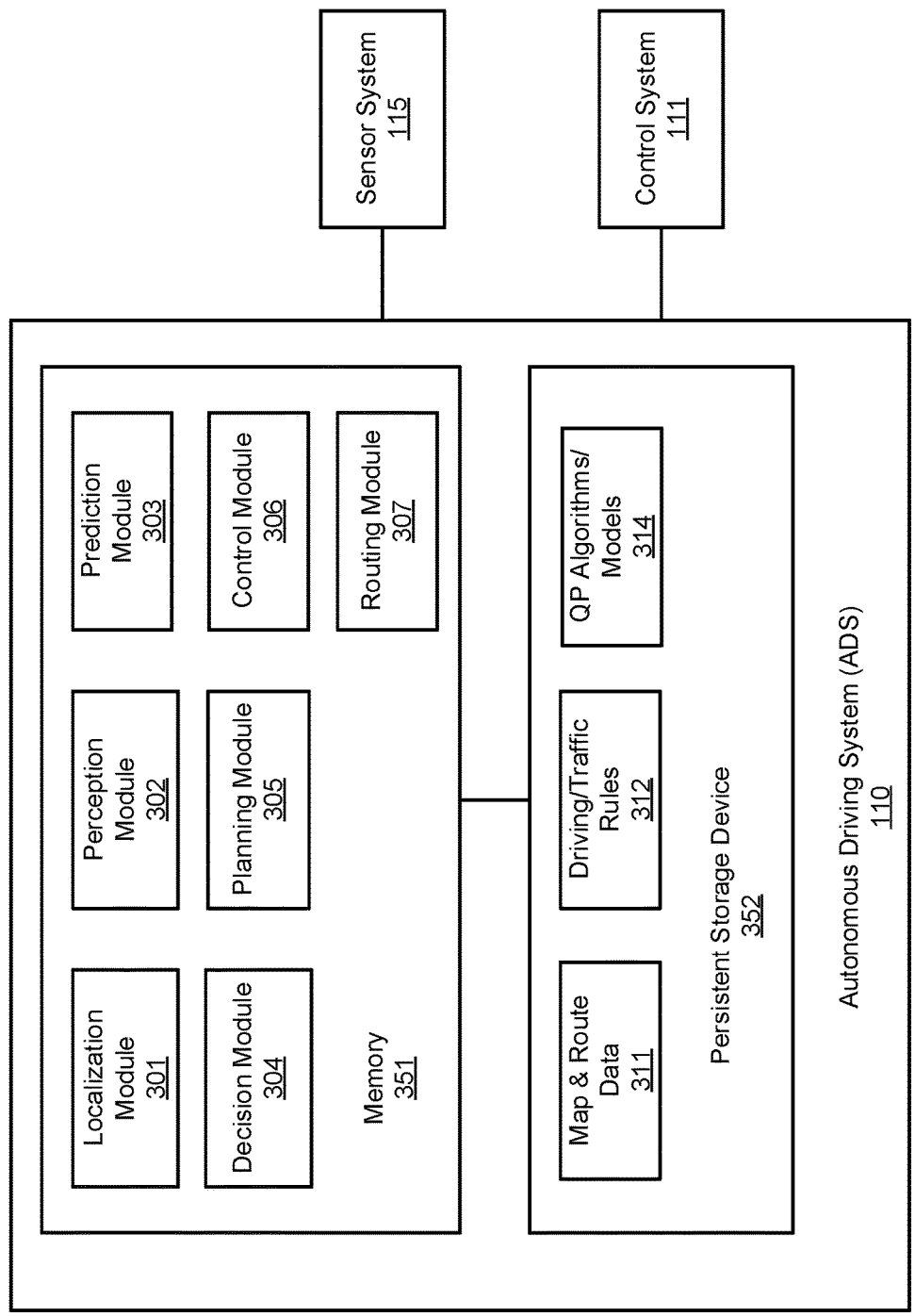
FIGS. 3A-3B are block diagrams illustrating an example of an autonomous driving system used with an autonomous driving vehicle according to one embodiment.
Figure 3B:
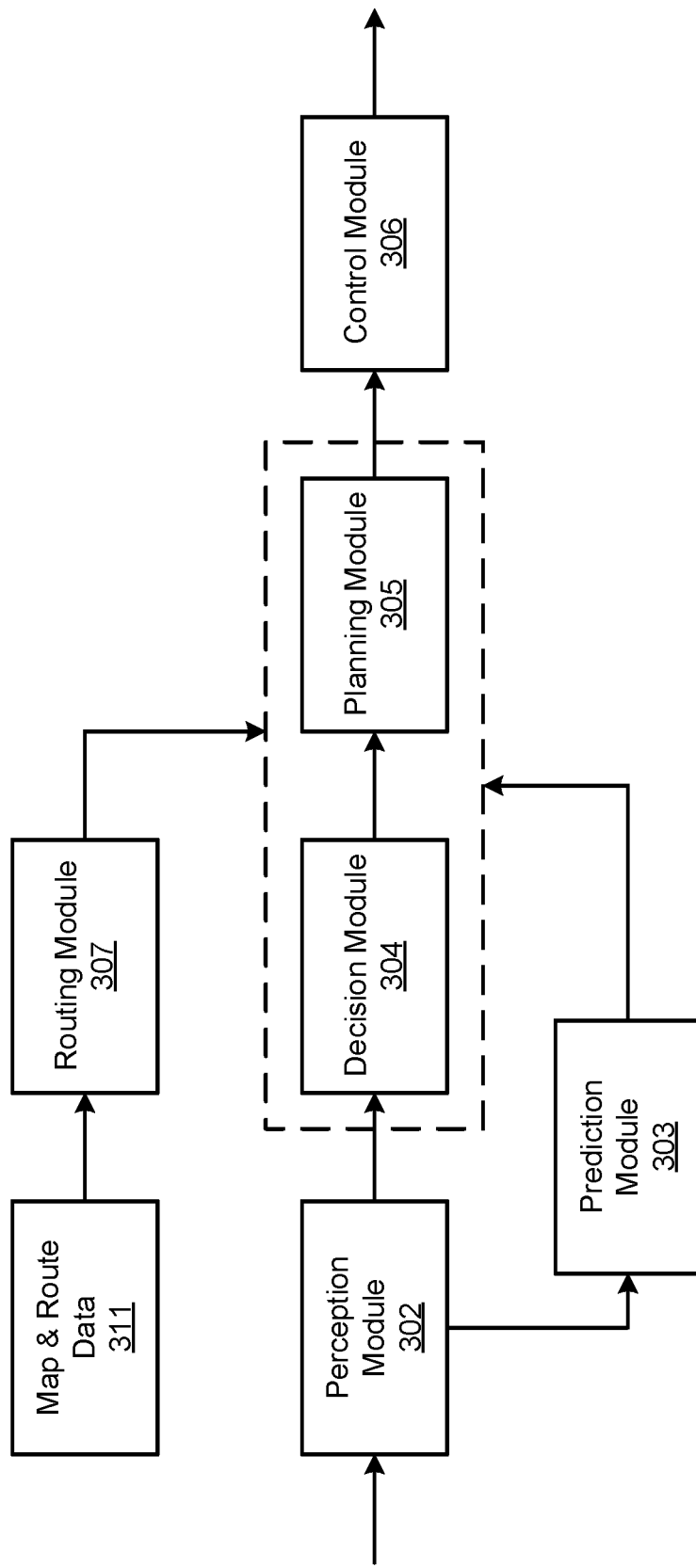

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
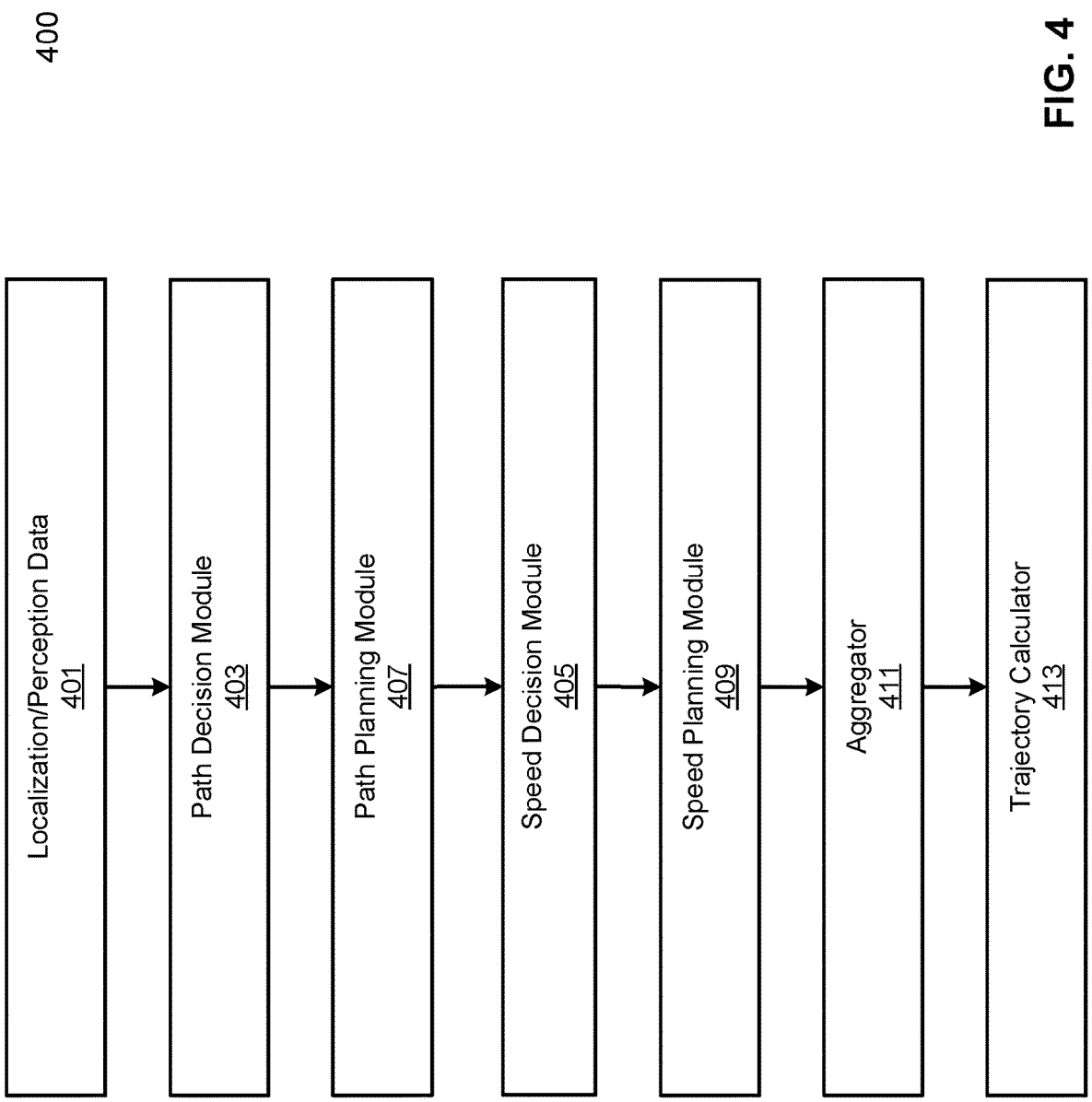
FIG. 4 is a block diagram illustrating an example of a decision and planning system according to one embodiment.

FIG. 4 is a block diagram illustrating an example of a decision and planning system according to one embodiment. System 400 may be implemented as part of autonomous driving system 300 of FIGS. 3A-3B to perform path planning and speed planning operations. Referring to FIG. 4, Decision and planning system 400 (also referred to as a planning and control or PnC system or module) includes, amongst others, routing module 307, localization/perception data 401, path decision module 403, speed decision module 405, path planning module 407, speed planning module 409, aggregator 411, and trajectory calculator 413.

Path decision module 403 and speed decision module 405 may be implemented as part of decision module 304. In one embodiment, path decision module 403 may include a path state machine, one or more path traffic rules, and a station-lateral maps generator. Path decision module 403 can generate a rough path profile as an initial constraint for the path/speed planning modules 407 and 409 using dynamic programming.

In one embodiment, the path state machine includes at least three states: a cruising state, a changing lane state, and/or an idle state. The path state machine provides previous planning results and important information such as whether the ADV is cruising or changing lanes. The path traffic rules, which may be part of driving/traffic rules 312 of FIG. 3A, include traffic rules that can affect the outcome of a path decisions module. For example, the path traffic rules can include traffic information such as construction traffic signs nearby the ADV can avoid lanes with such construction signs. From the states, traffic rules, reference line provided by routing module 307, and obstacles perceived by perception module 302 of the ADV, path decision module 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time.

In one embodiment, a state-lateral (SL) maps generator (not shown) generates an SL map as part of the rough path profile. An SL map is a two-dimensional geometric map (similar to an x-y coordinate plane) that includes obstacles information perceived by the ADV. From the SL map, path decision module 403 can lay out an ADV path that follows the obstacle decisions. Dynamic programming (also referred to as a dynamic optimization) is a mathematical optimization method that breaks down a problem to be solved into a sequence of value functions, solving each of these value functions just once and storing their solutions. The next time the same value function occurs, the previous computed solution is simply looked up saving computation time instead of recomputing its solution.

Speed decision module 405 or the speed decision module includes a speed state machine, speed traffic rules, and a station-time graphs generator (not shown). Speed decision process 405 or the speed decision module can generate a rough speed profile as an initial constraint for the path/speed planning modules 407 and 409 using dynamic programming. In one embodiment, the speed state machine includes at least two states: a speed-up state and/or a slow-down state. The speed traffic rules, which may be part of driving/traffic rules 312 of FIG. 3A, include traffic rules that can affect the outcome of a speed decisions module. For example, the speed traffic rules can include traffic information such as red/green traffic lights, another vehicle in a crossing route, etc. From a state of the speed state machine, speed traffic rules, rough path profile/SL map generated by decision module 403, and perceived obstacles, speed decision module 405 can generate a rough speed profile to control when to speed up and/or slow down the ADV. The SL graphs generator can generate a station-time (ST) graph as part of the rough speed profile.

In one embodiment, path planning module 407 includes one or more SL maps, a geometry smoother, and a path costs module (not shown). The SL maps can include the station-lateral maps generated by the SL maps generator of path decision module 403. Path planning module 407 can use a rough path profile (e.g., a station-lateral map) as the initial constraint to recalculate an optimal reference line using quadratic programming. Quadratic programming (QP) involves minimizing or maximizing an objective function (e.g., a quadratic function with several variables) subject to bounds, linear equality, and inequality constraints.

One difference between dynamic programming and quadratic programming is that quadratic programming optimizes all candidate movements for all points on the reference line at once. The geometry smoother can apply a smoothing algorithm (such as B-spline or regression) to the output station-lateral map. The path costs module can recalculate a reference line with a path cost function, to optimize a total cost for candidate movements for reference points, for example, using QP optimization performed by a QP module (not shown). For example, in one embodiment, a total path cost function can be defined as follows:

$$\text{path cost} = \Sigma_{points}(\text{heading})^2 + \Sigma_{points}(\text{curvature})^2 + \Sigma_{points}(\text{distance})^2,$$

where the path costs are summed over all points on the reference line, heading denotes a difference in radial angles (e.g., directions) between the point with respect to the reference line, curvature denotes a difference between curvature of a curve formed by these points with respect to the reference line for that point, and distance denotes a lateral (perpendicular to the direction of the reference line) distance from the point to the reference line. In some embodiments, distance represents the distance from the point to a destination location or an intermediate point of the reference line. In another embodiment, the curvature cost is a change between curvature values of the curve formed at adjacent points. Note the points on the reference line can be selected as points with equal distances from adjacent points. Based on the path cost, the path costs module can recalculate a reference line by minimizing the path cost using quadratic programming optimization, for example, by the QP module.

Speed planning module 409 includes station-time graphs, a sequence smoother, and a speed costs module. The station-time graphs can include a ST graph generated by the ST graphs generator of speed decision module 405. Speed planning module 409 can use a rough speed profile (e.g., a station-time graph) and results from path planning module 407 as initial constraints to calculate an optimal station-time curve. The sequence smoother can apply a smoothing algorithm (such as B-spline or regression) to the time sequence of points. The speed costs module can recalculate the ST graph with a speed cost function to optimize a total cost for movement candidates (e.g., speed up/slow down) at different points in time.

For example, in one embodiment, a total speed cost function can be:

$$\text{speed cost} = \Sigma_{points}(\text{speed}')^2 + \Sigma_{points}(\text{speed}'')^2 + (\text{distance})^2,$$

where the speed costs are summed over all time progression points, speed' denotes an acceleration value or a cost to change speed between two adjacent points, speed" denotes a jerk value, or a derivative of the acceleration value or a cost to change the acceleration between two adjacent points, and distance denotes a distance from the ST point to the destination location. Here, the speed costs module calculates a station-time graph by minimizing the speed cost using quadratic programming optimization, for example, by the QP module.

Aggregator 411 performs the function of aggregating the path and speed planning results. For example, in one embodiment, aggregator 411 can combine the two-dimensional ST graph and SL map into a three-dimensional SLT graph. In another embodiment, aggregator 411 can interpolate (or fill in additional points) based on two consecutive points on an SL reference line or ST curve. In another embodiment, aggregator 411 can translate reference points from (S, L) coordinates to (x, y) coordinates. Trajectory generator 413 can calculate the final trajectory to control ADV 510. For example, based on the SLT graph provided by aggregator 411, trajectory generator 413 calculates a list of (x, y, T) points indicating at what time should the ADC pass a particular (x, y) coordinate.

Thus, path decision module 403 and speed decision module 405 are configured to generate a rough path profile and a rough speed profile taking into consideration obstacles and/or traffic conditions. Given all the path and speed decisions regarding the obstacles, path planning module 407 and speed planning module 409 are to optimize the rough path profile and the rough speed profile in view of the obstacles using QP programming to generate an optimal trajectory with minimum path cost and/or speed cost.

Figure 5:
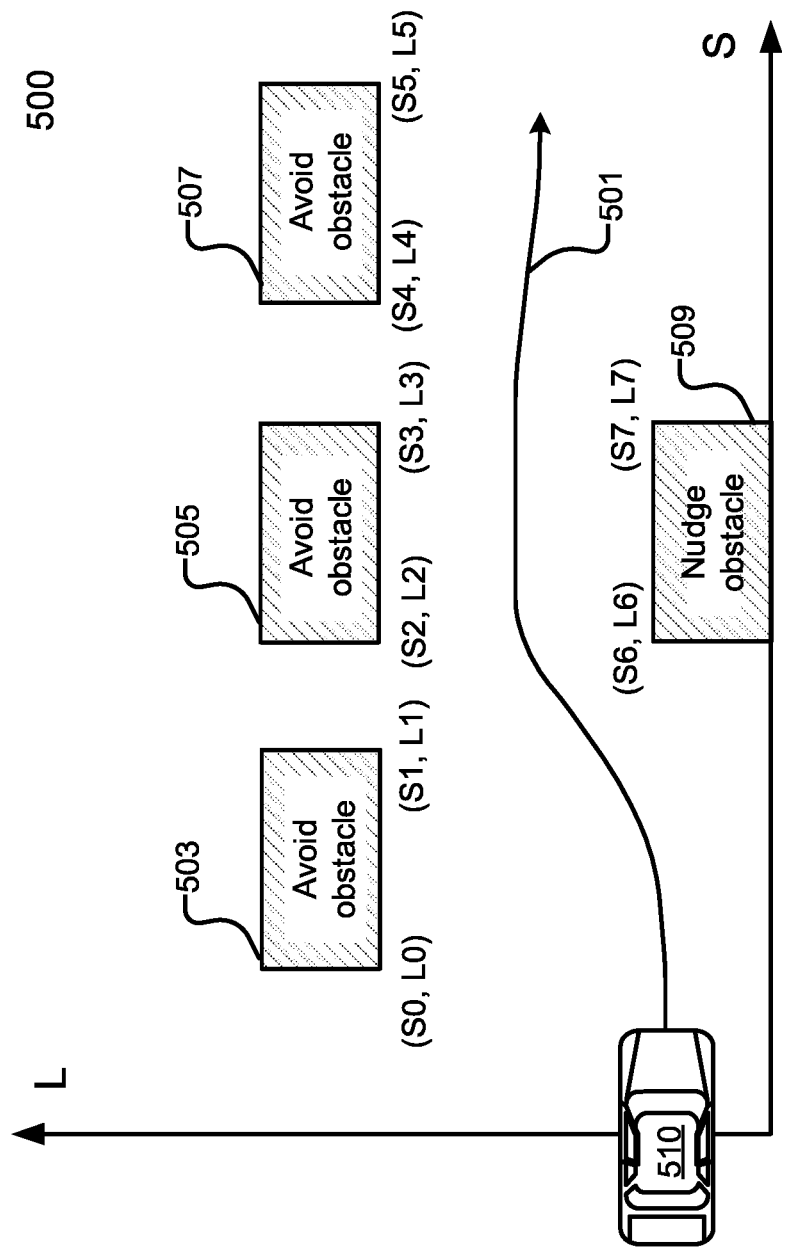
FIG. 5 is a block diagram illustrating a station-lateral map according to one embodiment.

FIG. 5 is a block diagram illustrating a station-lateral map according to one embodiment. Referring to FIG. 5, SL map 500 has an S horizontal axis, or station, and an L vertical axis, or lateral. As described above, station-lateral coordinates are a relative geometric coordinate system that references a particular stationary point on a reference line and follows the reference line. For example, a (S, L)=(1, 0) coordinate can denote one meter ahead of a stationary point (i.e., a reference point) on the reference line with zero meter lateral offset. A (S, L)=(2, 1) reference point can denote two meters ahead of the stationary reference point along the reference line and an one meter perpendicular lateral offset from the reference line, e.g., a left offset.

Referring to FIG. 5, SL map 500 includes reference line 501 and obstacles 503-509 perceived by ADV 510. In one embodiment, obstacles 503-509 may be perceived by a RADAR or LIDAR unit of ADV 510 in a different coordinate system and translated to the SL coordinate system. In another embodiment, obstacles 503-509 may be artificially formed barriers as constraints so the decision and planning modules would not search in the constrained geometric spaces. In this example, a path decision module can generate decisions for each of obstacles 503-509 such as decisions to avoid obstacles 503-508 and nudge (approach very closely) obstacle 509 (i.e., these obstacles may be other cars, buildings and/or structures). A path planning module can then recalculate or optimize reference line 501 based on a path cost in view of obstacles 503-509 using QP programming to fine tune reference line 501 with the minimum overall cost as described above. In this example, the ADV nudges, or approaches very close, for obstacle 509 from the left of obstacle 509.

Figure 6:
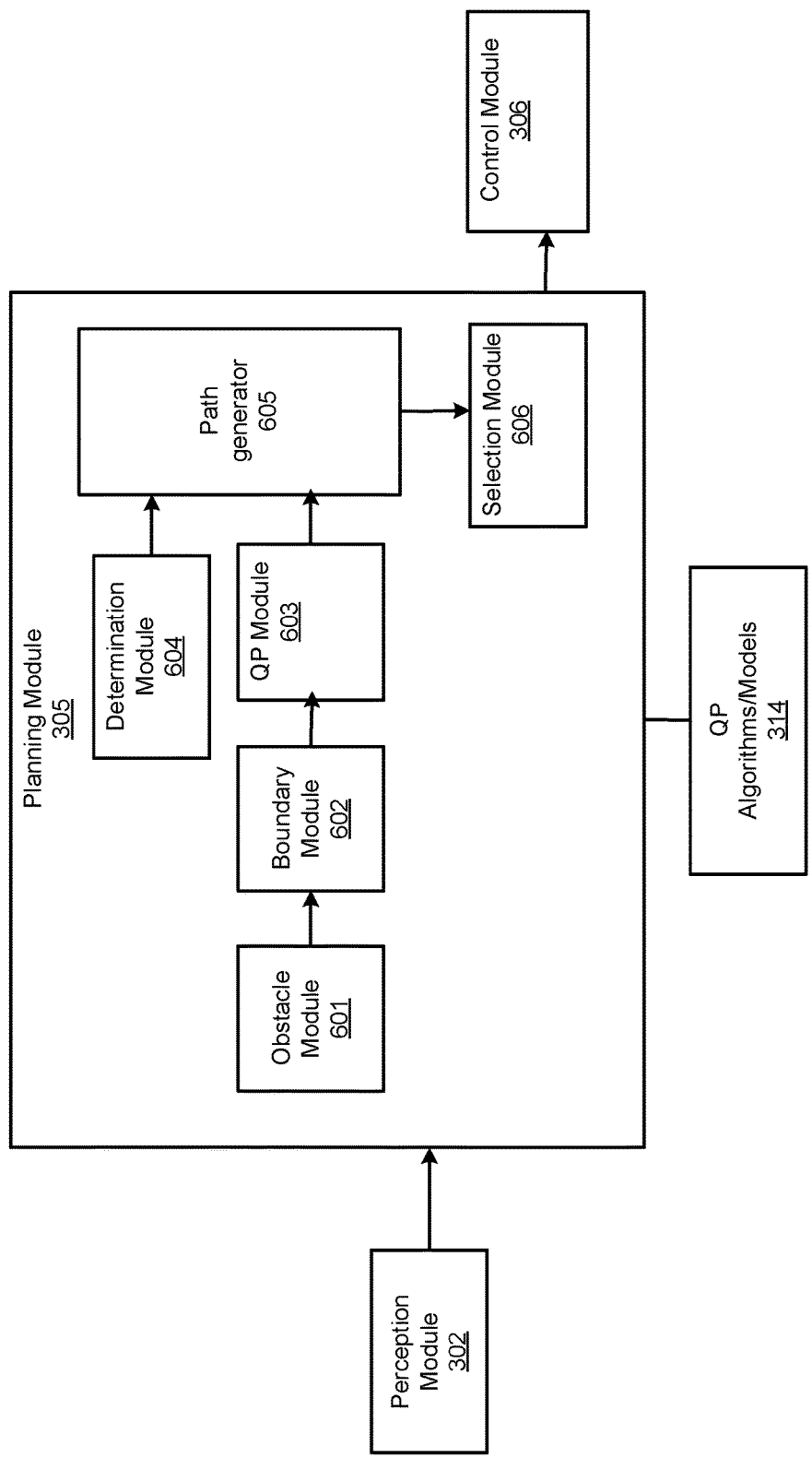
FIG. 6 is an example of a planning module with a parallel obstacle buffer system according to one embodiment.

FIG. 6 is an example of a planning module with a parallel obstacle buffer system according to one embodiment. Referring to FIG. 6, planning module 305 includes, but is not limited to, obstacle module 601, boundary module 602, QP module 603, determination module 604, path generator 605 and selection module 606, which work together using QP algorithms or models 314 to perform path planning of the ADV. Note that modules 601-606 may be integrated into fewer number of modules or a single module.

According to one embodiment, perception module 302 is configured to perceive a driving environment based on sensor data obtained from a plurality of sensors mounted on the ADV, including detecting one or more obstacles. Obstacle module 601 is configured to generate a set of obstacle boundaries for the one or more obstacles, where each of the set of obstacle boundaries has a corresponding buffer distance ranging from a predetermined minimum buffer distance to a predetermined maximum buffer distance. Path generator 605 is configured to generate a set of paths of the ADV using quadratic programming based on the set of obstacle boundaries in parallel, where each path of the set of paths corresponds to one of the set of obstacle boundaries. Selection module 606 is configured to select a path from successful paths of the set of paths based on a corresponding obstacle boundary having a smallest corresponding buffer distance, wherein the ADV is at least a predetermined distance away from the one or more obstacles in the successful paths. Control module 306 is configured to control the ADV to drive autonomously according the selected path to avoid the one or more obstacles.

In one embodiment, determination module 604 is configured to determine whether a load of a processor of the ADV is larger than a predetermined threshold. In one embodiment, boundary module 602 is configured to determine a set of right or left boundaries for the set of paths of the ADV, wherein each of the set of right or left boundaries is determined based on a corresponding obstacle boundary of the set of obstacle boundaries. In one embodiment, each of the set of right or left boundaries is determined to have a distance of a corresponding buffer distance of the corresponding obstacle boundary from the one or more obstacles. In one embodiment, the predetermined minimum buffer distance is 60 cm, and to the predetermined maximum buffer distance is 100 cm. In one embodiment, the predetermined distance is 50 cm.

Figure 7:
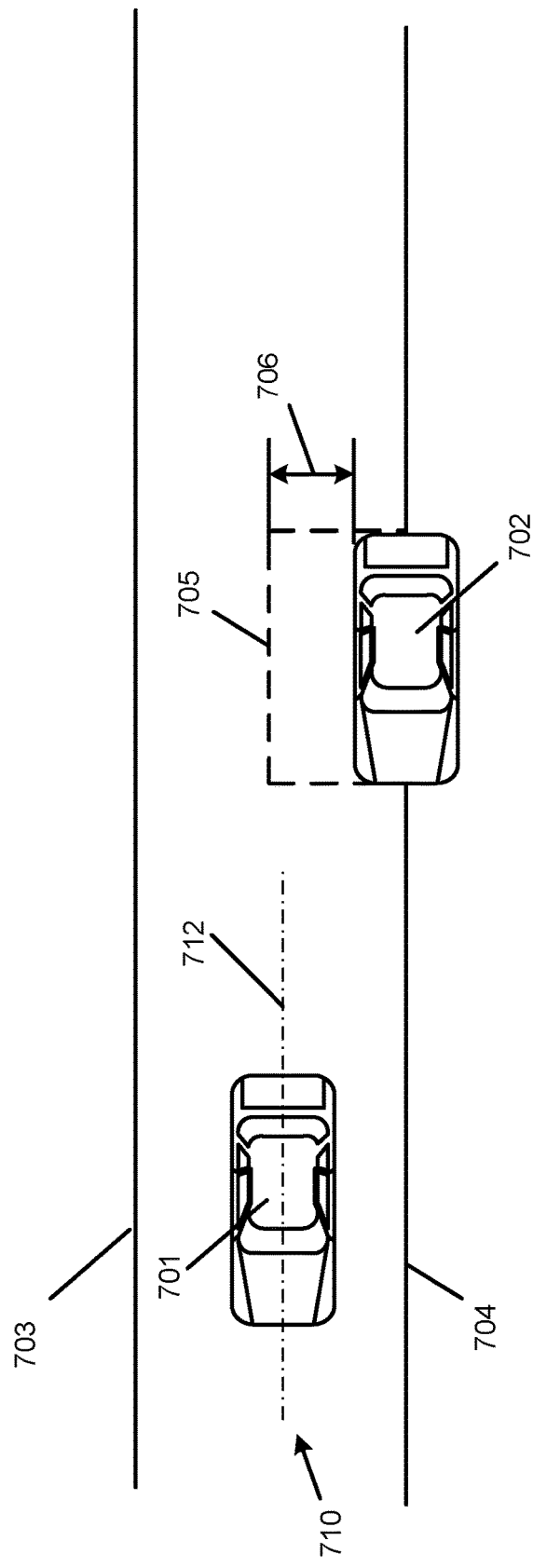
FIGS. 7, 8A and 8B are diagrams illustrating an example of a path planning using a parallel obstacle buffer system.

FIG. 7 is diagram illustrating an example of a method to perform path planning using a buffer distance. Referring to FIG. 7, an ADV may be driving along a center 712 of a road 710. A plurality of sensors mounted on the ADV may detect one or more obstacles, for example, an obstacle 702. The one or more obstacles may include a static obstacle (e.g., parked vehicles, bicycles, motorcycles, or structures), or a dynamic obstacle (e.g., moving vehicles, bicycles, motorcycles, pedestrians, or animals).

Path planning for the ADV may be performed based on QP optimization. QP optimization is the process of solving a special type of mathematical optimization problem—specifically, a linearly constrained quadratic optimization problem, that is the problem of optimizing (minimizing or maximizing) a quadratic function of several variables subject to linear constraints on these variables. QP is a particular type of nonlinear programming. QP optimization may be performed on a target function or cost function such that a total cost of the target function or cost function reaches minimum while a set of constraints are satisfied.

QP optimization may be used to optimize a path based on a cost function in the SL coordinates. In the SL coordinate system, path coordinates of a path are station coordinate S (a distance along the path) and lateral coordinate L (a distance a point is from the path, measured on a line that intersects the point and the path, and is perpendicular to the path at the point of intersection). QP optimization may be performed to find an optimal function of a lateral coordinate L=f (s) with respect to a station coordinate in SL coordinates, based on the cost function. For example, the cost functional may be a combination of lane cost and smoothness cost. The cost function may be as below.

$$C_s(f) = w_0 \int (f(s))^2 ds + w_1 \int (f'(s))^2 ds + w_2 \int (f''(s))^2 ds + w_3 \int (f'''(s))^2 ds$$

Where $C_s(f)$ represents a total cost, $f(s)$ represents a planned path in SL coordinates, $w_0 \int f(s)^2 ds$ represents a cost associated with a difference between the planned path and a reference line, and $w_1 \int (f'(s))^2 ds + w_2 \int (f''(s))^2 ds + w_3 \int (f'''(s))^2 ds$ represents a cost associated with a smoothness of the planned path. In the smoothness cost functional, $f'(s)$ represents the heading difference between the lane and the ADV, $f''(s)$ is related to the curvature of the path, and $f'''(s)$ is related to the derivative of the curvature.

As QP optimization based path planning is using a QP solver, all of costs in the cost function need to be in quadratic form. However, a distance between the ADV 701 and the obstacle 702 cannot form a quadratic form. The larger the distance between the ADV 701 and the obstacle 702, the better the optimization, but the quadratic form may result in the worse optimization. Thus, a buffer with a buffer distance 706 may be used to keep a distance from the ADV 701 to the obstacle 702 during QP path planning.

An obstacle boundary 705 based on the buffer distance 706 may be used to perform path planning in order to avoid the obstacle 702. The obstacle boundary 705 may have the buffer distance 706 to the obstacle 702. The buffer distance 706 may refer to a distance between the obstacle boundary 705 to a closet edge of the obstacle 702. The obstacle boundary 705 may be associated with the buffer distance between the obstacle boundary 705 and the obstacle 702.

As shown in FIG. 7, when the ADV is driving on the road 710, a right boundary 704 and a left boundary 703 may be determined. For example, the right boundary 704 and the left boundary 703 may be determined based on a right boundary of the road and a left boundary of the road, respectively. When the ADV 701 detects the obstacle 702 on the right side, the right boundary 704 may be set to by adding a buffer distance 706 to the obstacle 702. In one embodiment, the right boundary 704 may be determined based on the obstacle boundary 705, which is along a line at the buffer distance 706 from the closest edge of the obstacle 702. The portion of the right boundary 704 near the obstacle 702 may be the obstacle boundary 705 having the buffer distance 706 from the obstacle 702.

The ADV 701 and the obstacle 702 may need to maintain at least a predetermined safe threshold distance, for example, at all time. The buffer distance 706 may be larger than the predetermined safe threshold distance. For example, the predetermined safe threshold distance may be 50 cm. For example, the buffer distance may be 60 cm. The ADV 701 may be at least the predetermined safe threshold distance away from the obstacle 702 in successful paths. When an actual distance between the ADV 701 and the obstacle 702 is less than the predetermined safe threshold distance, a planned path may fail and not be successful.

However, in certain situations, a planned path may fail because the actual distance between the ADV 701 and the obstacle 702 is less than the predetermined safe threshold distance. FIG. 8A illustrates an example of such situations. For example, path planning may be performed for the ADV 710 based on a first obstacle boundary 705 having a first buffer distance, e.g., 60 cm. A first planned path 810 may be generated based on the first obstacle boundary 705. The ADV 710 may try to drive on the first planned path 810 to avoid the obstacle 702. However, the ADV 701 may be at a distance 816 from a closest edge of the ADV 701 to the obstacle 702 on the first planned path, while the distance 816 may be less than the predetermined safe threshold distance, even though the ADV 701 is within the right boundary 704 based on the obstacle boundary 705. Because the distance 806 is less than the predetermined safe threshold distance, the first planned path 810 may fail.

Thus, the buffer distance may need to be increased in order to maintain the predetermined safe threshold distance. On the other hand, the buffer distance may not be too large because a large buffer distance may push the ADV away from the center of the road. In addition, the large buffer distance may increase a chance of QP optimization failure. It is a tradeoff between maintaining a distance to the obstacle and avoiding being away from the center of the road.

Figure 8B:
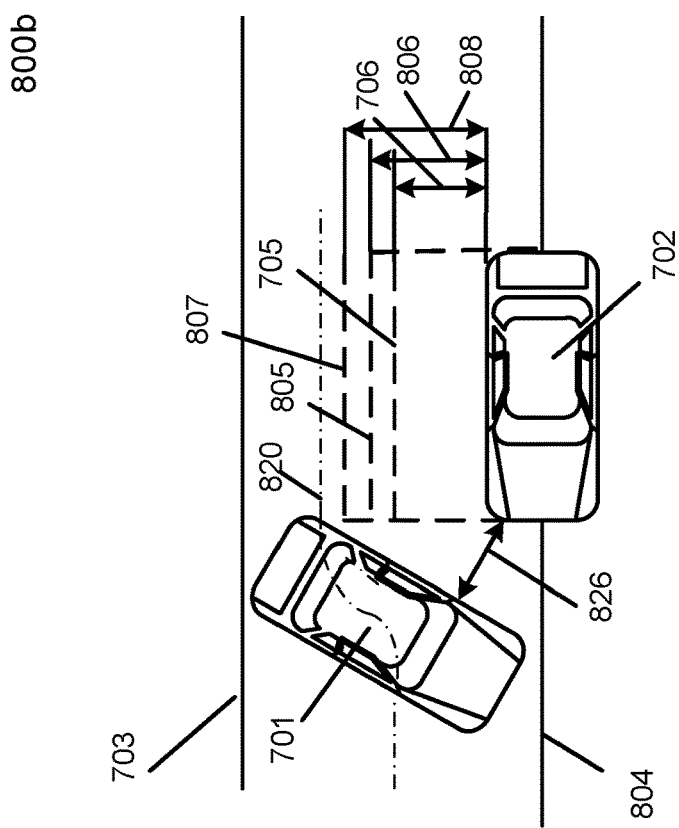
Figure 8A:
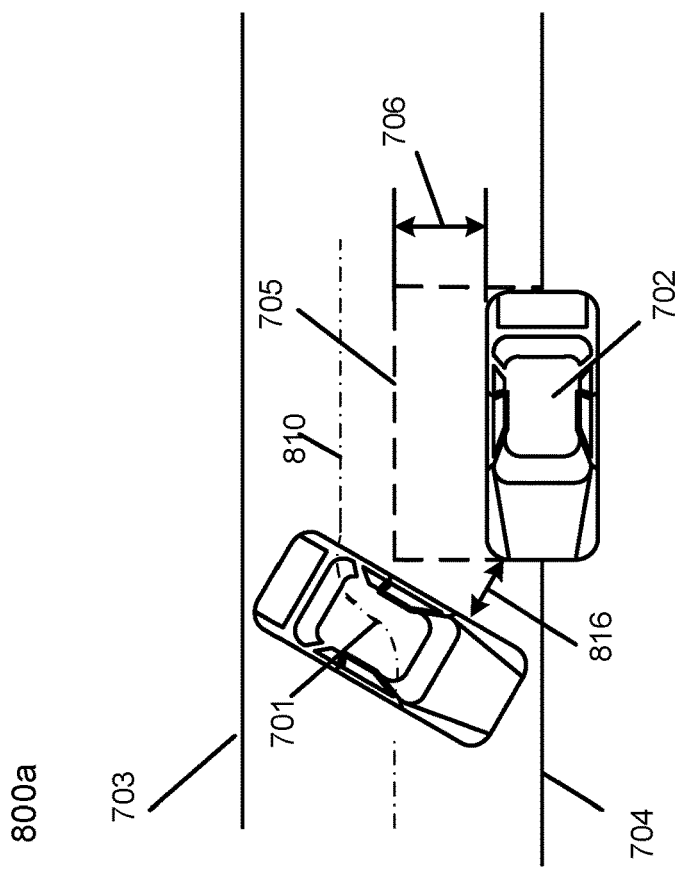

FIG. 8B illustrates an example of a path planning using a parallel obstacle buffer system. Instead of generating one obstacle boundary using one buffer with one buffer distance, multiple obstacle boundaries using multiple buffers having multiple buffer distances may be generated. In this way, a distance between the ADV and the obstacle may be increased such that the predetermined safe threshold distance to the obstacle may be maintained.

As shown in FIG. 8B, a second buffer may be generated. A second obstacle boundary 805 with the second buffer having a second buffer distance 806 may be generated, while the second buffer distance 806 is larger than the first buffer distance 706. Path planning may be performed for the ADV 710 based on the first obstacle boundary 705 having the first buffer distance 706 and the second obstacle boundary 805 having the second buffer distance 806. Because the second buffer distance 806 is larger than the first buffer distance 706, the ADV 701 may be at a distance 826 from a closest edge of the ADV 701 to the obstacle 702 on the second planned path 820, and the distance 826 may be larger than the predetermined safe threshold distance. Thus, the second planned path 820 may be a successful path. However, the second buffer distance 806 cannot be too large to avoid the ADV being too far away from the center of the road.

In path planning, multiple buffers having multiple buffer distances (e.g., 706, 806, 808) from a predetermined minimum buffer distance to a predetermined maximum buffer distance may be generated. For example, the predetermined minimum buffer distance may be 60 cm, and the predetermined maximum buffer distance may be 100 cm. The multiple buffer distances may be 60, 70, 80, 90, 100 cm. Multiple obstacle boundaries (e.g., 705, 805, 807) corresponding to the multiple buffers having multiple buffer distances may be generated.

A set of obstacle boundaries (e.g., 705, 805, 807) based on a set of buffer distances (e.g., 706, 806, 808) for the one or more obstacles (e.g., 702) may be generated. The set of obstacle boundaries (e.g., 705, 805, 807) correspond to the set of buffer distances (e.g., 706, 806, 808). In one embodiment, the set of obstacle boundaries may include multiple obstacle boundaries. The multiple obstacle boundaries correspond to the multiple buffers with the multiple buffer distances. Each of the set of obstacle boundaries may have a corresponding buffer distance to the one or more obstacles. The corresponding buffer distance ranges from the predetermined minimum buffer distance to the predetermined maximum buffer distance. The predetermined safe threshold distance needs to be maintained between the ADV and the one or more obstacles, for example, at all time. The ADV 701 may need to be at least predetermined safe threshold distance from the one or more obstacles. For example, the predetermined safe threshold distance may be 50 cm.

The multiple buffer with multiple buffer distances may apply to all obstacles. All of the one or more obstacles may have the multiple buffer distances. In one embodiment, each obstacle may have its own different buffer. In one embodiment, in order to reduce computational complexity, all of the one or more obstacles may have the same multiple buffer distances. For example, in a first planned path, all of the one or more obstacles may have a same first buffer distance; in a second planned path, all of the one or more obstacles may have a same second buffer distance; and so on.

The one or more obstacles may include static obstacles, such as parked vehicles, motorcycles, bicycles, or structures. In one embodiment, the obstacles may also include low speed moving vehicles, motorcycles, bicycles, pedestrians, animals, etc. The one or more obstacles may be located on the right side of the road, or the left side of the road.

In one embodiment, for dynamic obstacles with high speed, an obstacle area may include an area from a current position of the obstacle to a predicted position of the obstacle, and a buffer may be added to the obstacle area. An obstacle boundary may be generated based on the buffer with a buffer distance to the obstacle area.

A set of paths (e.g., 810, 820) of the ADV 701 may be generated by using quadratic programming based on the set of obstacle boundaries (e.g., 705, 805) in parallel, where each path of the set of paths corresponding to one of the set of obstacle boundaries. During path planning, multiple threads may be used to calculate multiple paths (e.g., 810, 820) with different buffers having different buffer distances (e.g., 706, 806). The multiple threads may run in parallel, such that running the multiple threads won't result in extra calculation time.

Please note that the multiple paths parallel generating may require to check if an autonomous driving system of the ADV is overload. In one embodiment, if a load of system resources such as a central processing unit (CPU) of the system CPU load is larger than a predetermined threshold, the multiple paths parallel generating may not be performed to avoid add an extra load to the system or alternatively, a number of paths as path candidates for QP optimization may be reduced based on the system resource usage. In this case, a default obstacle boundary with the predetermined minimum buffer distance may be used. For example, the predetermined threshold may be 60%. For example, the predetermined minimum buffer distance may be 60 cm. When the load of the CPU of the ADV is larger than the predetermined threshold, where the set of obstacle boundaries may include one obstacle boundary having the predetermined minimum buffer distance.

After the set of paths (e.g., 810, 820) have been generated using QP optimization based on the set of obstacle boundaries (e.g., 705, 805) in parallel, the results of the planning of the set of paths may be checked. Some of the set of paths may fail. For example, the first planned path 810 may fail because the distance 816 between the ADV 710 and the obstacle 702 is less than the predetermined safe threshold distance. Some of the set of paths may be successful paths, where the ADV 701 is at least a predetermined safe threshold distance away from the one or more obstacles (e.g., 702) in the successful paths.

After the multiple paths (e.g., 810, 820) have been generated in parallel, a path may be selected from successful paths of the multiple paths based on a smallest corresponding buffer distance. As discussed above, each path of the set of paths has a corresponding obstacle boundary with a corresponding buffer distance. Among the successful paths, one path (e.g., 820) may be selected based on a corresponding obstacle boundary having a smallest corresponding buffer distance. The one path (e.g., 820) that is not failed with the smallest buffer distance may be selected.

The selected successful path (e.g., 820) with the smallest buffer may be used as an output path. The ADV may be controlled to drive autonomously according the selected path to avoid the one or more obstacles and to avoid being far away from the center of the road.

Figure 9:
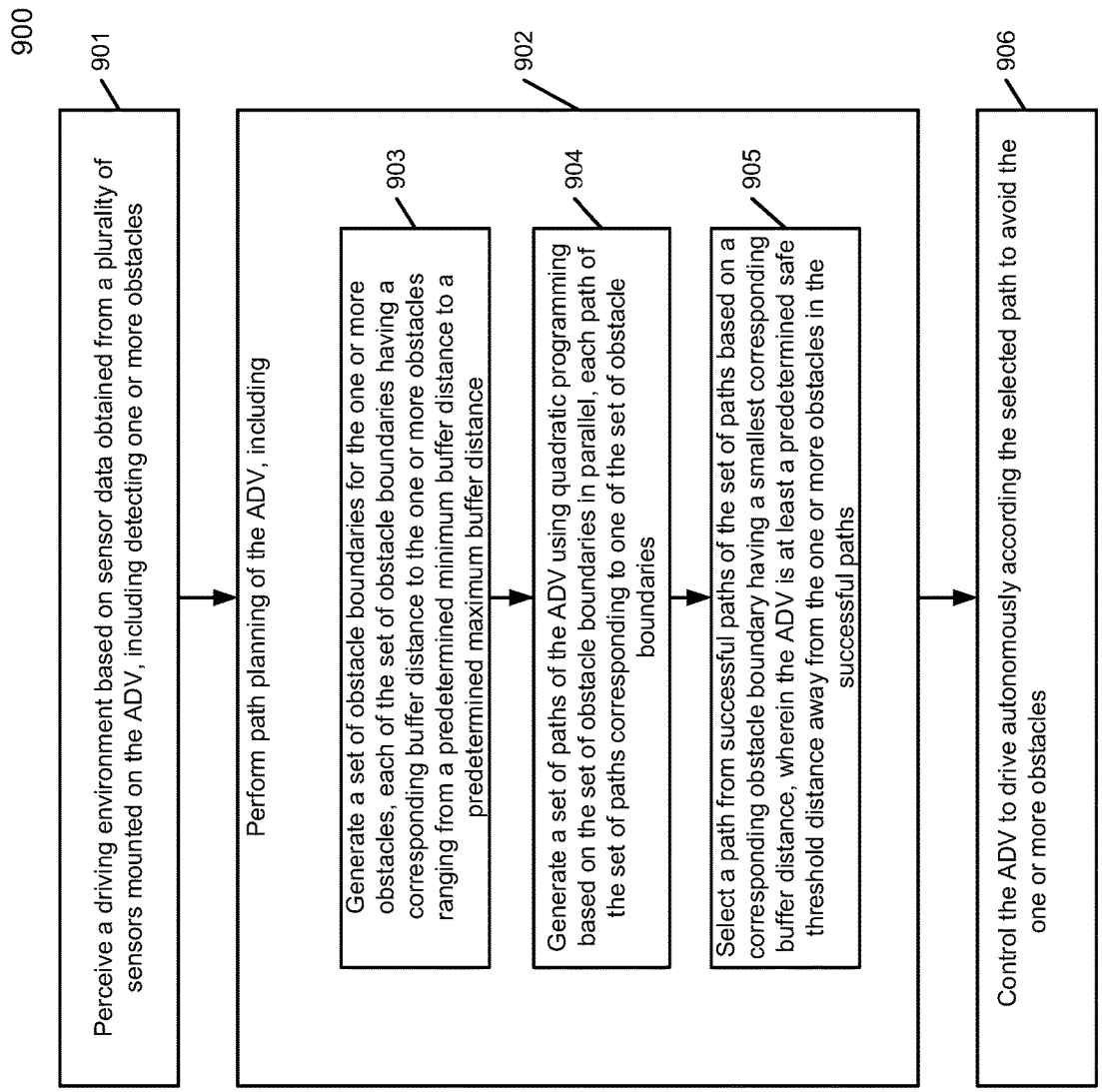
FIG. 9 is a flow diagram illustrating an example of a method to perform path planning using a parallel obstacle buffer system.

FIG. 9 is a flow diagram illustrating an example of a method to perform path planning using a parallel obstacle buffer system. Process 900 may be performed by processing logic which may include software, hardware, or a combination thereof. For example, process 900 may be performed by planning module 305. Referring to FIG. 9, in operation 901, processing logic perceives a driving environment based on sensor data obtained from a plurality of sensors mounted on the ADV, including detecting one or more obstacles.

In operation 902, processing logic performs path planning of the ADV. The operation 902 includes operation 903, 904 and 905. In operation 903, processing logic generate a set of obstacle boundaries for the one or more obstacles, where each of the set of obstacle boundaries has a corresponding buffer distance to the one or more obstacles ranging from a predetermined minimum buffer distance to a predetermined maximum buffer distance. In one embodiment, the predetermined minimum buffer distance is 60 cm, and to the predetermined maximum buffer distance is 100 cm. In one embodiment, the predetermined safe threshold distance is 50 cm.

In operation 904, processing logic generates a set of paths of the ADV using quadratic programming based on the set of obstacle boundaries in parallel, where each path of the set of paths corresponds to one of the set of obstacle boundaries.

In one embodiment, processing logic further determines whether a load of a processor of the ADV is larger than a predetermined threshold.

In one embodiment, processing logic further determines that a load of the CPU of the ADV is larger than a predetermined threshold, where the set of obstacle boundaries include one obstacle boundary having the predetermined minimum buffer distance.

In one embodiment, processing logic further determines a set of right or left boundaries for the set of paths of the ADV, where each of the set of right or left boundaries is determined based on a corresponding obstacle boundary of the set of obstacle boundaries. In one embodiment, each of the set of right or left boundaries includes a portion that is the corresponding obstacle boundary having a corresponding buffer distance to the one or more obstacles.

In operation 905, processing logic selects a path from successful paths of the set of paths based on a corresponding obstacle boundary having a smallest corresponding buffer distance, where the ADV is at least a predetermined safe threshold distance away from the one or more obstacles in the successful paths.

In operation 906, processing logic controls the ADV to drive autonomously according the selected path to avoid the one or more obstacles.

By this method, the ADV may plan a successful path to avoid the one or more obstacles while preventing from being far away from a center of a road.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   perceiving a driving environment based on sensor data obtained from a plurality of sensors mounted on the ADV, including detecting an obstacle;
   performing path planning of the ADV, including
      generating a plurality of obstacle boundaries with a plurality of buffer distances for the obstacle, the plurality of buffer distances ranging from a predetermined minimum buffer distance to a predetermined maximum buffer distance, each of the plurality of buffer distances including a distance between an obstacle boundary of the plurality of obstacle boundaries to a closest edge of the obstacle, each of the plurality of obstacle boundaries corresponding to a buffer distance of the plurality of buffer distances for the obstacle,
      generating a plurality of paths of the ADV using quadratic programming (QP) based on the plurality of obstacle boundaries in parallel, each path of the plurality of paths corresponding to a buffer distance of the plurality of buffer distances,
      selecting a path from the plurality of paths having a smallest corresponding buffer distance; and
   controlling the ADV to drive autonomously according to the selected path to avoid the obstacle.

2. The method of claim 1, further comprising:
   determining a system resource usage of an autonomous driving system; and
   adjusting a number of paths in the plurality of paths for QP optimization based on the system resource usage.

3. The method of claim 2, further comprising reducing the number of paths in the plurality of paths for QP optimization in response to determining that the system resource usage is greater than a predetermined threshold.

4. The method of claim 1, further comprising executing a plurality of threads, one for each of the plurality of paths, to perform QP optimization concurrently.

5. The method of claim 1, further comprising determining a plurality of right or left boundaries for the plurality of paths of the ADV, wherein each of the plurality of right or left boundaries is determined based on a corresponding obstacle boundary of the plurality of obstacle boundaries.

6. The method of claim 5, wherein each of the plurality of right or left boundaries includes a portion that is the corresponding obstacle boundary having a corresponding buffer distance to the obstacle.

7. The method of claim 1, wherein the predetermined minimum buffer distance is 60 centimeters (cm), and the predetermined maximum buffer distance is 100 cm.

8. The method of claim 1, wherein the ADV is at least a predetermined safe threshold distance away from the obstacle in the plurality of paths.

9. The method of claim 8, wherein the predetermined safe threshold distance is 50 cm.

10. A non-transitory machine-readable medium having instructions stored therein, which when executed by a processor, cause the processor to perform operations of operating an autonomous driving vehicle (ADV), the operations comprising:
    perceiving a driving environment based on sensor data obtained from a plurality of sensors mounted on the ADV, including detecting an obstacle;
    performing path planning of the ADV, including
       generating a plurality of obstacle boundaries with a plurality of buffer distances for the obstacle, the plurality of buffer distances ranging from a predetermined minimum buffer distance to a predetermined maximum buffer distance, each of the plurality of buffer distances including a distance between an obstacle boundary of the plurality of obstacle boundaries to a closest edge of the obstacle, each of the plurality of obstacle boundaries corresponding to a buffer distance of the plurality of buffer distances for the obstacle,
       generating a plurality of paths of the ADV using quadratic programming (QP) based on the plurality of obstacle boundaries in parallel, each path of the plurality of paths corresponding to a buffer distance of the plurality of buffer distances,
       selecting a path from the plurality of paths having a smallest corresponding buffer distance; and
    controlling the ADV to drive autonomously according to the selected path to avoid the obstacle.

11. The machine-readable medium of claim 10, wherein the operations further comprise:
    determining a system resource usage of an autonomous driving system; and
    adjusting a number of paths in the plurality of paths for QP optimization based on the system resource usage.

12. The machine-readable medium of claim 11, wherein the operations further comprise reducing the number of paths in the plurality of paths for QP optimization in response to determining that the system resource usage is greater than a predetermined threshold.

13. The machine-readable medium of claim 10, wherein the operations further comprise executing a plurality of threads, one for each of the plurality of paths, to perform QP optimization concurrently.

14. The machine-readable medium of claim 10, wherein the operations further comprise determining a plurality of right or left boundaries for the plurality of paths of the ADV, wherein each of the plurality of right or left boundaries is determined based on a corresponding obstacle boundary of the plurality of obstacle boundaries.

15. The machine-readable medium of claim 14, wherein each of the plurality of right or left boundaries includes a portion that is the corresponding obstacle boundary having a corresponding buffer distance to the obstacle.

16. The machine-readable medium of claim 10, wherein the predetermined minimum buffer distance is 60 centimeters (cm), and the predetermined maximum buffer distance is 100 cm.

17. The machine-readable medium of claim 10, wherein the ADV is at least a predetermined safe threshold distance away from the obstacle in the plurality of paths.

18. The machine-readable medium of claim 17, wherein the predetermined safe threshold distance is 50 cm.

19. A data processing system, comprising:
a processor; and
a memory coupled to the processor to store instructions, which when executed by the processor, cause the processor to perform operations of operating an autonomous driving vehicle (ADV), the operations including
perceiving a driving environment based on sensor data obtained from a plurality of sensors mounted on the ADV, including detecting an obstacle;
performing path planning of the ADV, including
generating a plurality of obstacle boundaries with a plurality of buffer distances for the obstacle, the plurality of buffer distances ranging from a predetermined minimum buffer distance to a predetermined maximum buffer distance, each of the plurality of buffer distances including a distance between an obstacle boundary of the plurality of obstacle boundaries to a closest edge of the obstacle, each of the plurality of obstacle boundaries corresponding to a buffer distance of the plurality of buffer distances for the obstacle,
generating a plurality of paths of the ADV using quadratic programming (QP) based on the plurality of obstacle boundaries in parallel, each path of the plurality of paths corresponding to a buffer distance of the plurality of buffer distances,
selecting a path from the plurality of paths having a smallest corresponding buffer distance; and
controlling the ADV to drive autonomously according to the selected path to avoid the obstacle.

20. The system of claim 19, wherein the operations further comprise:
determining a system resource usage of an autonomous driving system; and
adjusting a number of paths in the plurality of paths for QP optimization based on the system resource usage.

* * * * *